United States Patent [19]

Varterasian et al.

[11] 4,413,838

[45] Nov. 8, 1983

[54] PASSENGER RESTRAINT SYSTEM

[75] Inventors: John H. Varterasian, Livonia, Mich.; Albert R. Plack, Middleburg Heights, Ohio; Jackson W. Melichar, Sterling Heights, Mich.

[73] Assignee: General Motors Corporation, Detroit, Mich.

[21] Appl. No.: 321,115

[22] Filed: Nov. 13, 1981

[51] Int. Cl.³ .............................................. B60R 21/10
[52] U.S. Cl. .................................... 280/751; 297/135; 297/488
[58] Field of Search ............... 280/748, 730, 751, 753; 297/464, 487, 488, 160, 135

[56] References Cited

U.S. PATENT DOCUMENTS

| | | | |
|---|---|---|---|
| 3,640,572 | 2/1972 | Doehler | 297/390 |
| 3,811,701 | 5/1974 | Grime | 280/748 |
| 3,985,374 | 10/1976 | Powaska | 280/748 |

*Primary Examiner*—Richard A. Bertsch
*Attorney, Agent, or Firm*—Edward J. Biskup

[57] ABSTRACT

A restraint table for a vehicle that is normally stored within a console located along one side of a passenger seat and is connected to the console by a hinge member which allows sequential movement of the restraint table about a pair of substantially perpendicular axes so that the restraint table assumes a position in front of an occupant seated in the passenger seat.

3 Claims, 5 Drawing Figures

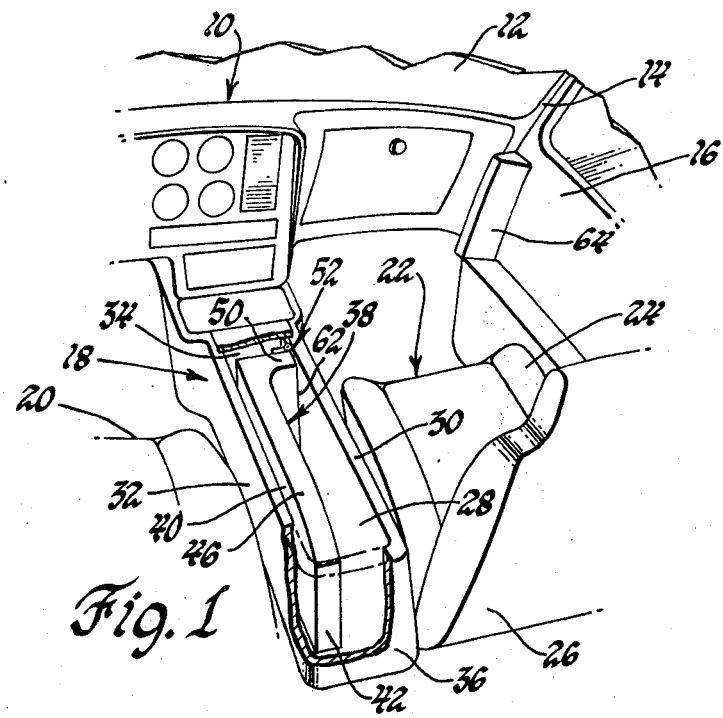
Fig. 1
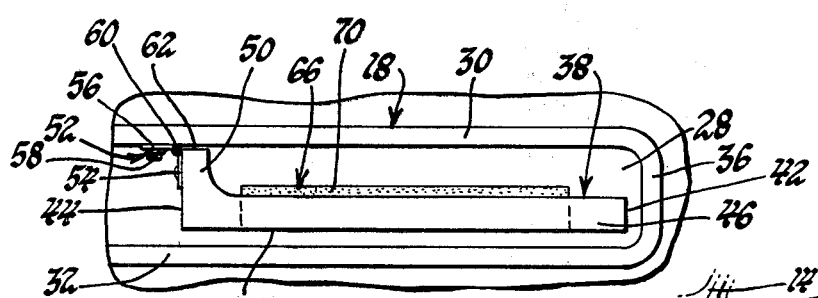
Fig. 2
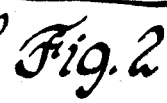
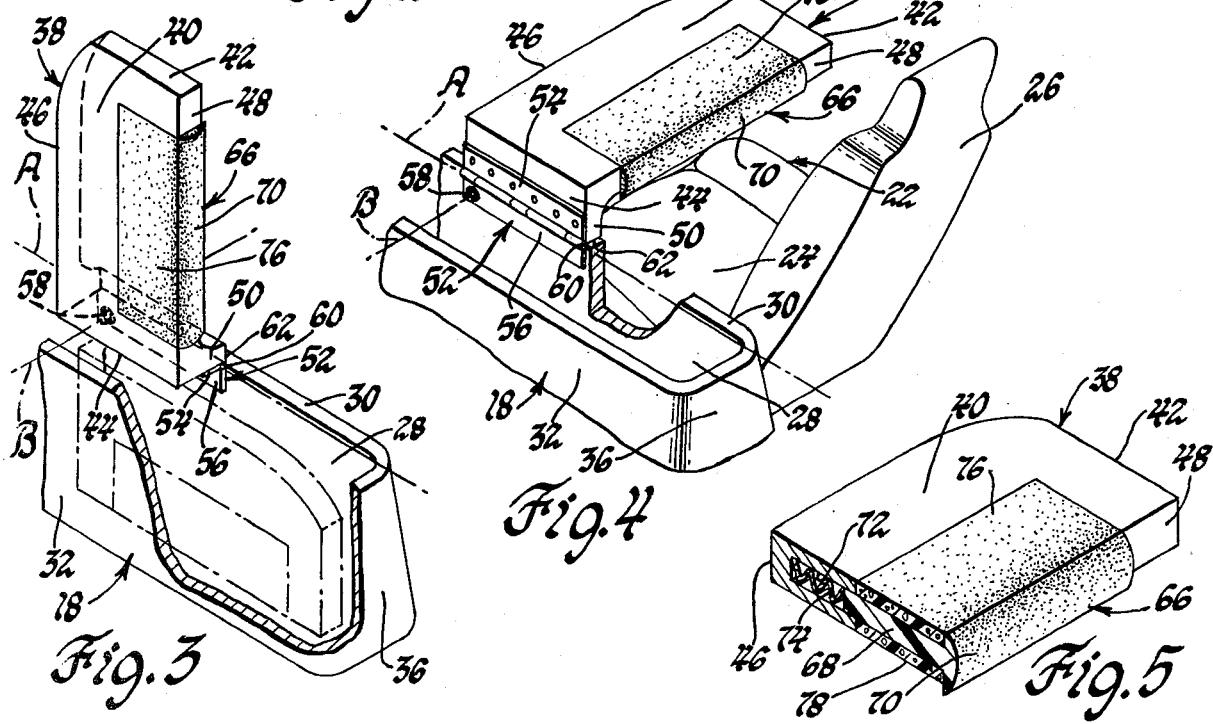
Fig. 3  Fig. 4  Fig. 5

PASSENGER RESTRAINT SYSTEM

This invention concerns a passenger restraint system for a motor vehicle and, more particularly, relates to a restraint table adapted to be positioned horizontally in front of a passenger for cushioning sudden forward movement thereof.

More specifically, the restraint system made in accordance with the present invention includes a restraint table located within a motor vehicle having a front passenger seat comprising a seat cushion and a seat back. The restraint table is normally stored in a vertical position adjacent the passenger seat and is supported at one end in a manner which permits the restraint table to be pivoted sequentially about a pair of substantially perpendicular pivot axes to thereby assume a horizontal position above the seat cushion forwardly of the seat back. In addition, a snubber is secured to the interior of the vehicle passenger door for limiting forward movement of the other end of the restraint table when in the horizontal deployed position. In the preferred form, the restraint table incorporates energy-absorbing means and is stored within a console located alongside the passenger seat so when the restraint table is deployed, it is located in close proximity to and is adapted to receive the impact load of the seated occupant's lower torso during sudden stops or deceleration of the vehicle.

The objects of the present invention are: to provide a new and improved restraint table for a vehicle that can be stored alongside a seated occupant in a vertical position and is manually movable to a horizontal position in front of the occupant; to provide a new and improved restraint table for a vehicle that is movable about a pair of mutually perpendicular pivot axes from a stored position adjacent the passenger seat to a deployed position in front of and in close proximity to the occupant of the passenger seat; to provide a new and improved restraint table that is normally stored within a console located along one side of a passenger seat and is connected to the console by a hinge member which allows sequential movement of the restraint table about a pair of substantially perpendicular pivot axes so that the restraint table assumes a position in front of an occupant seated in the passenger seat; to provide a new and improved restraint table for a vehicle that is initially pivoted along a plane that extends longitudinally of the vehicle and subsequently is pivoted along a transverse plane so as to position the restraint table horizontally and forwardly of a seated occupant for absorbing the impact load of the occupant's lower torso during sudden deceleration of the vehicle; and to provide a new and improved restraint table which is adapted to be located in a substantially horizontal plane rearwardly of a vehicle instrument panel and forwardly of a seated occupant, and incorporates crushable energy-absorbing means for restraining forward movement of the occupant.

These and other objects, features, and advantages of the present invention will be apparent from the following detailed description, taken in conjunction with the accompanying drawing, in which:

FIG. 1 is a fragmentary perspective view of a motor vehicle instrument panel attached to a console which houses a passenger restraint table made in accordance with the present invention;

FIG. 2 is a plan view of the console and passenger restraint table shown in FIG. 1;

FIG. 3 is a perspective view showing the passenger restraint table raised out of the console and assuming a vertical intermediate position;

FIG. 4 is a view similar to that seen in FIG. 3, but shows the restraint table located in the horizontal deployed position; and FIG. 5 is an enlarged perspective view of the restraint table with a portion broken away to show the energy-absorbing material incorporated therein.

Referring now to the drawing and more particularly to FIG. 1, thereof, a portion of the interior of an automotive vehicle is shown which includes an instrument panel 10, the forward end of which is positioned adjacent a conventional windshield 12. The vehicle structure includes the usual upright pillar 14 which supports the right-side edge of the windshield 12 and, as is conventional, also serves to hingedly carry the forward edge of the front passenger door 16. The central portion of the instrument panel 10 connects with the front end of a console 18 which extends rearwardly from the instrument panel 10 along the longitudinal axis of the vehicle and is located between the driver's seat 20 and passenger's seat 22, the latter of which includes the usual seat cushion 24 and seat-back 26. The console 18 has a rectangular chamber 28 formed therein which is defined by a pair of laterally spaced side walls 30 and 32, a front wall 34, and a rear wall 36. Located within the chamber 28 of the console 18 is a restraint table 38 made in accordance with this invention. The table 38 is manually movable from the stored position shown in FIGS. 1 and 2 to the deployed horizontal position shown in FIG. 4 wherein the restraint table 38 serves to cushion forward movement of the occupant of the passenger seat 22 during sudden stops or deceleration of the vehicle.

More specifically, the restraint table 38 comprises a generally flat body section 40 of uniform cross-sectional thickness that is rectangular in plan view and is defined by a pair of side edges 42 and 44, a front edge 46, and a rear edge 48. A depending leg 50 is integrally formed with the body section 40 of the restraint table 38 at the side edge 44 and, as seen in FIG. 4, is connected to the side wall 30 of the console 18 by a hinge 52. In this regard, it will be noted that one leaf 54 of the hinge 52 is rigidly secured to the leg 50 of the restraint table 38, while the other leaf 56 is connected to the side wall 30 of the console 18 by a bolt 58 which serves as a pivotal connection. Thus, the bolt 58 and a pin 60 interconnecting the leafs 54 and 56 of the hinge 52 allow the restraint table 38 to pivot about the longitudinal center axis A of the pin 60 and about a transverse axis B which is perpendicular to the longitudinal center axis A. This arrangement permits the restraint table 38 to be stored within the chamber 28 of the console 18—as seen in FIGS. 1 and 2, and be manually raised about the transverse axis B to the full-line intermediate position of FIG. 3, and thereafter pivoted about the longitudinal center axis A to the deployed horizontal position shown in FIG. 4.

In the deployed horizontal position of the restraint table 38, the flat bottom surface 62 of the leg 50 rests upon the top of the side wall 30, while the corner of the restraint table 38, defined by the side edge 42 and front edge 46, is located slightly behind a snubber 64 rigidly secured to the front passenger door 16. Also, it will be noted that in the deployed horizontal position of the restraint table 38, the body section 40 thereof will extend across the lap of the occupant seated in the passenger seat 22, and be located at a height which would allow a ninety-fifth percentile person to utilize the restraint table 38 as an armrest, desk, table, or similar convenience. In addition, it will be noted that the central portion of the restraint table 38 incorporates an energy-absorbing member 66 which, as best seen in FIG. 5, includes a bumper 68 having a padded head 70 made of elastomeric or similar material. Upon impact of the seated passenger, the bumper 68 is adapted to "telescope" forwardly into a chamber 72 formed in the body section 40 of the restraint table 38. The chamber 72 houses a zigzag metallic chamber 74 that is constrained at its rear end and is capable of being crushed in a controlled and predictable manner during forward movement of the bumper 68 so as to absorb the energy of the impact of the seated passenger's torso during sudden stops or deceleration of the vehicle. A pair of rectangular block members 76 and 78, made of a lightweight and porous plastic material, such as polyurethane, are part of the energy-absorbing member 66. The block members 76 and 78 are located above and below the bumper 68—between the padded head 70 thereof and the body section 40 of the restraint table 38. Thus, during the above-described forward telescoping movement of the bumper 68, the blocks 76 and 78 will also crush and thereby absorb the kinetic energy of the seated passenger.

It should be apparent from the above description that after the occupant is seated in the passenger seat 22 and the front passenger door 16 is closed as seen in FIG. 1, the restraint table 38 can be grasped at a point adjacent the side edge 42 thereof and raised upwardly so cause the restraint table to pivot about the transverse axis B to the full-line position of FIG. 3, and then moved downwardly about the longitudinal center axis A to the deployed horizontal position of FIG. 4. In this latter position, the side edge 42 of the restraint table 38 extends to the front passenger door 16 without contacting it. This allows the front passenger door 16 to be opened and closed. However, when the restraint table is pushed forwardly by the passenger's torso—as during a sudden stop of the vehicle—movement of the side edge 42 of the restraint table 38 is limited by the snubber 64 secured to the front passenger door 16, and the passenger's forward motion is absorbed by the energy-absorbing capabilities provided by the bumper 68, the metallic member 74, and the block members 76 and 78.

Various modifications and changes may be made in this construction without departing from the spirit of the invention. Such modifications and changes are contemplated by the inventors, and they do not wish to be limited except by the scope of the appended claims.

The embodiments of the invention for which an exclusive property or privilege is claimed are defined as follows:

1. In combination with a vehicle having a front passenger seat comprising a seat cushion and a seat-back, said vehicle having a console along one side of said passenger seat; a passenger restraint table normally stored in a vertical position and adapted to be moved to a horizontal position above said seat cushion forwardly of said seat-back and extend across the torso of a passenger, said table in said horizontal position having a substantial dimension longitudinally of the vehicle; means connecting one end of said passenger restraint table to said console and permitting said passenger restraint table to be initially pivoted upwardly from said console about a first axis which extends transversely to the longitudinal axis of the vehicle followed by pivotal movement about a second axis which is substantially perpendicular to said first axis so as to allow said passenger restraint table to be moved from said vertical position to said horizontal position, a snubber secured to said vehicle for limiting forward movement of the other end of said passenger restraint table when said passenger restraint table is located in said horizontal position; and energy-absorbing means incorporated within said passenger restraint table and having substantial extent and absorbing capability in the longitudinal direction of the vehicle; said means and said snubber cooperating to maintain said passenger restraint table in a fixed position so as to cause said energy-absorbing means to cushion forward movement of said passenger in said front passenger seat when the torso of said passenger impacts against said passenger restraint table during sudden deceleration of said vehicle.

2. In combination with a vehicle having a front passenger seat comprising a seat cushion and seat-back, said vehicle having a passenger door located adjacent one side of said seat and a console located adjacent the other side of said seat; a passenger restraint table normally stored within said console and adapted to be located in a horizontal position across the torso of a passenger, said restraint table in said horizontal position having a substantial dimension longitudinally of the vehicle; means supporting said passenger restraint table within said console and permitting said passenger restraint table to be initially pivoted upwardly from said console about a first axis which extends transversely to the longitudinal axis of the vehicle followed by pivotal movement about a second axis which is substantially perpendicular to said first axis so as to allow said passenger restraint table to be moved from a stored position within said console to a deployed position wherein said passenger restraint table is positioned horizontally between said console and said passenger door forwardly of said seat-back and above said seat cushion; a snubber secured to said passenger door for limiting forward movement of the free end of said passenger restraint table when said passenger restraint table is in said deployed position; and energy-absorbing means incorporated within said passenger restraint table and having substantial extent and absorbing capability in the longitudinal direction of the vehicle, said means and said snubber cooperating to maintain said passenger restraint table in a fixed position so as to cause said energy-absorbing means to cushion forward movement of said passenger in said front passenger seat when the torso of said passenger impacts against said passenger restraint table during sudden deceleration of said vehicle.

3. A passenger restraint system for use in a vehicle having a front passenger seat comprising a seat cushion and a seat-back, said vehicle having a passenger door and a console located adjacent said passenger seat, said passenger restraint system including a table adapted to be stored in an upright position and be manually moved therefrom to a horizontal position above and across said seat cushion forwardly of said seat-back and extend across the torso of a passenger, said table in said horizontal position having a substantial dimension longitudinally of the vehicle; means adapted to connect one end of said table to said console and permit said table to be initially pivoted upwardly from said console about a first axis which extends transversely to the longitudinal axis of the vehicle followed by pivotal movement about a second axis which is substantially perpendicular to said first axis so as to allow said passenger restraint table to be moved from said upright position to said horizontal position; a snubber adapted to be secured to a portion of said vehicle for limiting forward movement of the other end of said table when said table is in said horizontal position; and energy-absorbing means incorporated within said table and having substantial extent and absorbing capability in the longitudinal direction of the vehicle, said means and said snubber adapted to cooperate to maintain said table in a fixed position so as to cause said energy-absorbing means to cushion forward movement of said passenger in said front passenger seat when the torso of said passenger impacts against said table during sudden deceleration of said vehicle, said energy-absorbing means including a bumper adapted to move forwardly against a crushable member housed within said table upon impact of said torso of said passenger.

* * * * *